(12) United States Patent
Montojo et al.

(10) Patent No.: US 10,555,310 B2
(45) Date of Patent: Feb. 4, 2020

(54) FORWARD COMPATIBILITY IN NEW RADIO SYSTEMS

(71) Applicant: QUALCOMM Incorporated, San Diego, CA (US)

(72) Inventors: Juan Montojo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/965,698

(22) Filed: Apr. 27, 2018

(65) Prior Publication Data

US 2018/0317217 A1 Nov. 1, 2018

Related U.S. Application Data

(60) Provisional application No. 62/492,937, filed on May 1, 2017.

(51) Int. Cl.
*H04W 72/04* (2009.01)

(52) U.S. Cl.
CPC ....... *H04W 72/048* (2013.01); *H04W 72/042* (2013.01)

(58) Field of Classification Search
CPC ......... H04L 29/08018; H04L 29/0854; H04W 72/048; H04W 72/042; H04W 8/22; H04W 48/02
See application file for complete search history.

(56) References Cited

U.S. PATENT DOCUMENTS

| 5,479,477 | A | * | 12/1995 | McVey | ................. | H04W 84/08 |
| | | | | | | 455/17 |
| 7,082,311 | B2 | * | 7/2006 | Hefner | .................... | G01S 19/48 |
| | | | | | | 342/357.29 |
| 8,254,276 | B2 | * | 8/2012 | Hsu | ........................ | H04L 69/24 |
| | | | | | | 370/252 |

(Continued)

FOREIGN PATENT DOCUMENTS

| WO | WO-2013022310 A2 * | 2/2013 | ............... H04L 5/14 |
| WO | WO-2015171047 A1 | 11/2015 | |

OTHER PUBLICATIONS

International Search Report and Written Opinion—PCT/US2018/030220—ISA/EPO—dated Jul. 23, 2018.

*Primary Examiner* — Julio R Perez
(74) *Attorney, Agent, or Firm* — Linda G. Gunderson; Holland & Hart LLP

(57) ABSTRACT

Methods, systems, and devices for wireless communication are described. In some wireless communications systems, a base station may communicate with multiple user equipment (UEs) that support different features. As described herein, a base station may schedule communications on a set of resources with UEs that support a particular feature. The base station may transmit an indication (e.g., to one or more UEs) of the feature that is to be supported for a UE to communicate on the set of resources, and the UE may receive the indication and determine whether to communicate on the set of resources based on determining if the particular feature is supported. Accordingly, a UE that fails to support the feature may reduce processing costs and save power by ignoring the set of resources.

30 Claims, 11 Drawing Sheets

(56) References Cited

U.S. PATENT DOCUMENTS

| | | | | |
|---|---|---|---|---|
| 8,804,616 B2* | 8/2014 | Grant | ................... | H04W 76/16 |
| | | | | 370/328 |
| 9,001,750 B2* | 4/2015 | Zhang | ................... | H04W 8/22 |
| | | | | 370/329 |
| 9,386,460 B2* | 7/2016 | Liang | ................... | H04W 16/14 |
| 9,497,693 B2* | 11/2016 | Ishii | ................... | H04L 27/2601 |
| 9,516,651 B2* | 12/2016 | Bostrom | ............. | H04W 72/048 |
| 9,585,008 B2* | 2/2017 | Hsu | ........................ | H04W 8/24 |
| 2006/0056350 A1* | 3/2006 | Love | ................ | H04W 72/0406 |
| | | | | 370/331 |
| 2011/0090809 A1 | 4/2011 | Chen et al. | | |
| 2012/0002614 A1 | 1/2012 | Ekici et al. | | |
| 2013/0095812 A1* | 4/2013 | Siddam | ............... | H04L 41/0893 |
| | | | | 455/419 |
| 2014/0098761 A1* | 4/2014 | Lee | ................... | H04W 74/006 |
| | | | | 370/329 |
| 2015/0264637 A1 | 9/2015 | Zaus et al. | | |
| 2016/0088542 A1* | 3/2016 | Belghoul | .......... | H04W 28/0268 |
| | | | | 370/331 |
| 2018/0123859 A1* | 5/2018 | Liu | ................... | H04L 29/0854 |

\* cited by examiner

FORWARD COMPATIBILITY IN NEW RADIO SYSTEMS

CROSS REFERENCES

The present Application for Patent claims benefit of U.S. Provisional Patent Application No. 62/492,937 by MONTOJO et al., entitled "Forward Compatibility In New Radio Systems," filed May 1, 2017, assigned to the assignee hereof, and expressly incorporated by reference in its entirety.

BACKGROUND

The following relates generally to wireless communication and more specifically to forward compatibility in New Radio (NR) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a NR system).

A wireless multiple-access communications system may include a number of base stations or access network nodes, each simultaneously supporting communication for multiple communication devices, which may be otherwise known as user equipment (UE). A base station may communicate with multiple UEs that may support different features in a wireless communications system. In some aspects, a base station may schedule communication with a group of UEs on a set of resources according to a particular feature (e.g., carrier aggregation). In such aspects, some UEs (e.g., "legacy" UEs) may not support the particular feature, and inefficient techniques for identifying such UEs may be detrimental to a wireless communications system.

SUMMARY

In some wireless communications systems, a base station may communicate with multiple user equipment (UEs) that support different features. As described herein, a base station may schedule communications on a set of resources with UEs that support a particular feature. The base station may transmit an indication (e.g., to one or more UEs) of the feature that is to be supported for a UE to communicate on the set of resources, and the UE may receive the indication and determine whether to communicate on the set of resources based on determining if the particular feature is supported. Accordingly, a UE that fails to support the feature may reduce processing costs and save power by ignoring the set of resources.

A method of wireless communication is described. The method may include receiving, at a UE, an indication that identifies one or more features that are to be supported in order to communicate on a set of resources, determining that the one or more features are unsupported based on a release of a wireless standard supported by the UE, a type of the one or more features, or a combination thereof, and ignoring the set of resources based on the determination.

An apparatus for wireless communication at a UE is described. The apparatus may include means for receiving, at a UE, an indication that identifies one or more features that are to be supported in order to communicate on a set of resources, means for determining that the one or more features are unsupported based on a release of a wireless standard supported by the UE, a type of the one or more features, or a combination thereof, and means for ignoring the set of resources based on the determination.

Another apparatus for wireless communication is described. The apparatus may include a processor, memory in electronic communication with the processor, and instructions stored in the memory. The instructions may be operable to cause the processor to receive an indication that identifies one or more features that are to be supported in order to communicate on a set of resources, determine that the one or more features are unsupported based on a release of a wireless standard supported, a type of the one or more features, or a combination thereof, and ignore the set of resources based on the determination.

A non-transitory computer readable medium for wireless communication at a UE is described. The non-transitory computer-readable medium may include instructions operable to cause a processor to receive, at a UE, an indication that identifies one or more features that are to be supported in order to communicate on a set of resources, determine that the one or more features are unsupported based on a release of a wireless standard supported by the UE, a type of the one or more features, or a combination thereof, and ignore the set of resources based on the determination.

In some examples of the method, apparatus, and non-transitory computer-readable medium described above, receiving the indication that identifies the one or more features includes receiving an indication that identifies a release of a wireless standard that excludes the one or more features. Some examples of the method, apparatus, and non-transitory computer-readable medium described above may further include processes, features, means, or instructions for determining that the release of the wireless standard supported by the UE includes the release of the wireless standard that excludes the one or more features or an earlier release than the release of the wireless standard that excludes the one or more features. Some examples of the method, apparatus, and non-transitory computer-readable medium described above may further include processes, features, means, or instructions for ignoring the set of resources based on the determination.

In some examples of the method, apparatus, and non-transitory computer-readable medium described above, receiving the indication that identifies the one or more features includes receiving an indication that identifies one or more optional features of a wireless standard. In some examples of the method, apparatus, and non-transitory computer-readable medium described above, the set of resources includes forward compatible resources. In some examples of the method, apparatus, and non-transitory computer-readable medium described above, the indication may be received in a system information block (SIB). In some examples of the method, apparatus, and non-transitory computer-readable medium described above, the indication may be received on a physical downlink control channel (PDCCH).

A method of wireless communication is described. The method may include identifying a set of resources for communication with one or more UEs, transmitting an indication that identifies one or more features that are to be supported in order for the UEs to communicate on the set of resources, and communicating on the set of resources with the one or more UEs that support the one or more features identified by the indication.

An apparatus for wireless communication is described. The apparatus may include means for identifying a set of resources for communication with one or more UEs, means for transmitting an indication that identifies one or more features that are to be supported in order for the UEs to communicate on the set of resources, and means for communicating on the set of resources with the one or more UEs that support the one or more features identified by the indication.

Another apparatus for wireless communication is described. The apparatus may include a processor, memory in electronic communication with the processor, and instructions stored in the memory. The instructions may be operable to cause the processor to identify a set of resources for communication with one or more UEs, transmit an indication that identifies one or more features that are to be supported in order for the UEs to communicate on the set of resources, and communicate on the set of resources with the one or more UEs that support the one or more features identified by the indication.

A non-transitory computer readable medium for wireless communication is described. The non-transitory computer-readable medium may include instructions operable to cause a processor to identify a set of resources for communication with one or more UEs, transmit an indication that identifies one or more features that are to be supported in order for the UEs to communicate on the set of resources, and communicate on the set of resources with the one or more UEs that support the one or more features identified by the indication.

In some examples of the method, apparatus, and non-transitory computer-readable medium described above, transmitting the indication that identifies the one or more features includes transmitting an indication that identifies a release of a wireless standard that excludes the one or more features. In some examples of the method, apparatus, and non-transitory computer-readable medium described above, transmitting the indication that identifies the one or more features includes transmitting an indication that identifies one or more optional features of a wireless standard.

In some examples of the method, apparatus, and non-transitory computer-readable medium described above, the set of resources includes forward compatible resources. In some examples of the method, apparatus, and non-transitory computer-readable medium described above, the indication of the one or more features may be transmitted in a SIB. In some examples of the method, apparatus, and non-transitory computer-readable medium described above, the indication of the one or more features may be transmitted on a PDCCH.

Some examples of the method, apparatus, and non-transitory computer-readable medium described above may further include processes, features, means, or instructions for identifying a condition to avoid communicating with a UE that fails to support the one or more features, transmitting the indication that identifies the one or more features that may be to be supported in order for the UE to communicate on the set of resources based on the identified condition, refraining from communicating with the UE based on transmitting the indication.

DETAILED DESCRIPTION

Figure 1:
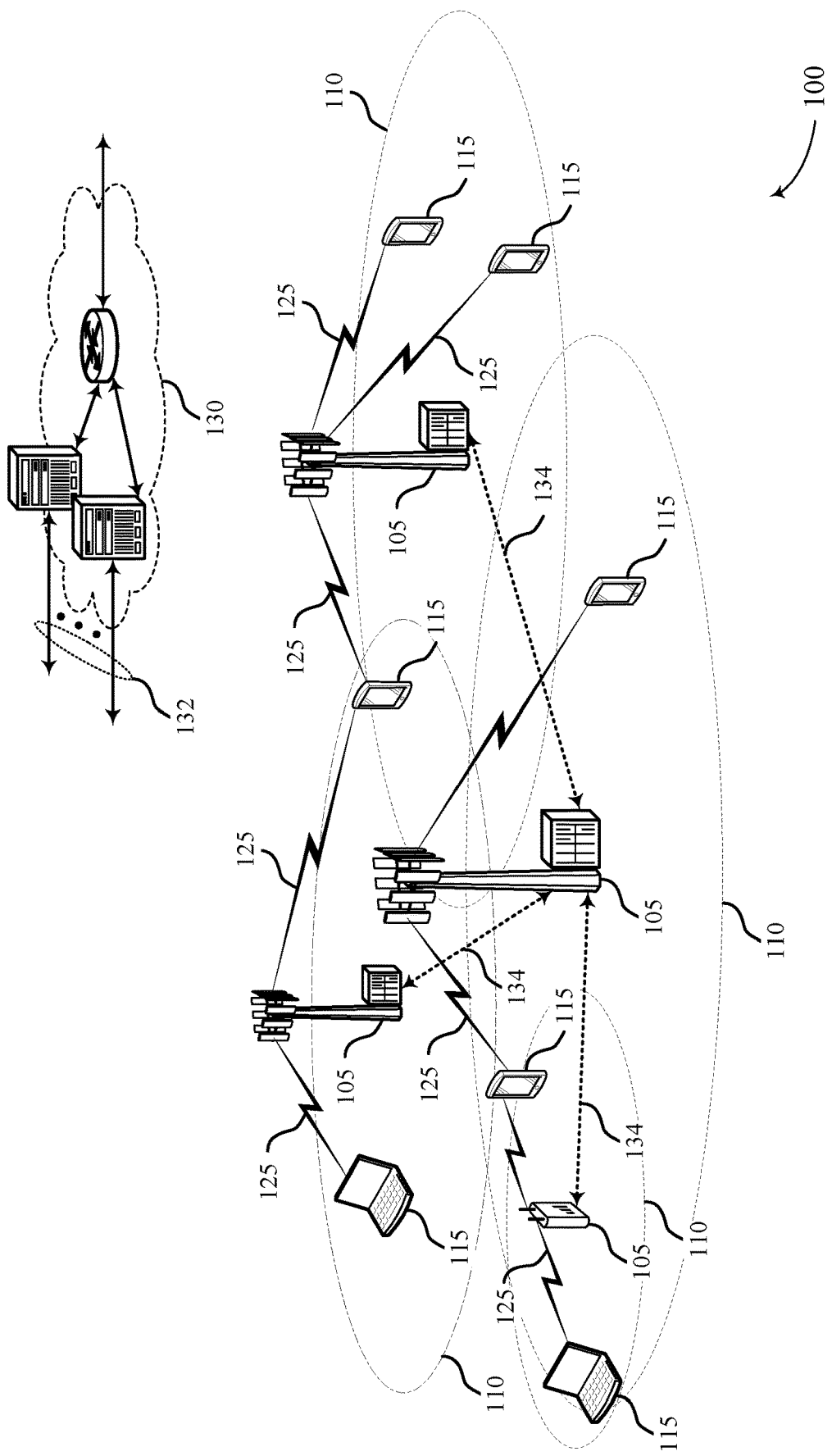
FIG. 1 illustrates an example of a wireless communications system that supports forward compatibility in New Radio (NR) systems in accordance with various aspects of the present disclosure.

Wireless communications systems described herein may support efficient techniques for signaling to a user equipment (UE) features that are to be supported in order for the UE to communicate on a set of resources.

Wireless multiple-access technologies have been adopted in various telecommunication standards to provide a common protocol that enables different wireless devices to communicate on a municipal, national, regional, and even global level. An example telecommunication standard is long term evolution (LTE). LTE is designed to improve spectral efficiency, lower costs, improve services, make use of new spectrum, and better integrate with other open standards. A telecommunication standard, such as the LTE standard, may include multiple releases that each support a defined set of features with later releases supporting more advanced features than earlier releases. A UE supporting a particular release may support the features specified in the release or a subset of the features specified in the release (i.e., some features may be specified as optional features).

A wireless communications system may support communication between a base station and multiple UEs according to features specified in various releases of a standard. In some aspects, different groups of UEs operating in a wireless communications system may support different features. As such, a base station may identify a set of "legacy" UEs that support older features in a wireless communications system, and, for communications with a set of newer UEs on a set of resources, the base station may transmit an indication of the set of resources to the set of "legacy" UEs to enable the "legacy" UEs to ignore the indicated set of resources. In some wireless communications systems (e.g., New Radio (NR) systems), however, it may be challenging to define a group of "legacy" UEs, since new channels, signals, procedures, etc. are introduced that may or may not be supported by UEs in the system.

As described herein, a wireless communications system may support efficient techniques for communicating on a set of resources with specific UEs, while allowing other UEs to ignore the set of resources. Specifically, a base station may transmit an indication of features that are to be supported for communication on a set of resources to a group of UEs. In some aspects, the base station may transmit an indication of a release of a standard that fails to support one or more features intended for communication on a set of resources, and UEs supporting the indicated release or an earlier release (e.g., UEs that do not support the feature) may ignore the set of resources. In other aspects, the base station may indicate a specific feature that is to be supported for communication on a set of resources (e.g., an optional feature of a standard), and UEs that fail to support the specific feature may ignore the set of resources.

Aspects of the disclosure introduced above are described below in the context of a wireless communications system. Examples of processes and signaling exchanges that support forward compatibility in NR systems are then described. Aspects of the disclosure are further illustrated by and described with reference to apparatus diagrams, system diagrams, and flowcharts that relate to forward compatibility in NR systems.

FIG. 1 illustrates an example of a wireless communications system 100 that supports forward compatibility in NR systems in accordance with various aspects of the present disclosure. Wireless communications system 100 includes base stations 105, UEs 115, and a core network 130. In some examples, wireless communications system 100 may be a 5th Generation (5G)/NR, LTE or LTE-Advanced (LTE-A) network. In some aspects, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. A telecommunication standard, such as the LTE standard, may include multiple releases that each support a defined set of features with later releases supporting more advanced features than earlier releases.

A UE 115 supporting a particular release may support the features specified in the release or a subset of the features specified in the release (i.e., some features may be specified as optional features). In some aspects, UEs 115 in wireless communications system 100 may support different releases of a wireless standard or different features of various releases of a wireless standard. Thus, some UEs 115 may support more advanced features than other UEs 115 in wireless communications system 100. In some examples, a base station 105 may indicate a set of resources used for communication with newer UEs 115 in wireless communications system 100 to "legacy" UEs 115 (i.e., UEs that support previous releases of the telecommunication standard) to allow the "legacy" UEs 115 to identify and ignore these resources. However, in wireless communications system 100, it may be challenging to define "legacy" UEs 115, since new features are introduced that may or may not be supported (e.g., optional features) by UEs 115 in the system.

Wireless communications system 100 may support efficient techniques for facilitating communications with "legacy" UEs 115 within the system by allowing these "legacy" UEs 115 to identify and ignore certain resources. In particular, "legacy" UEs 115 may be defined for communication on a set of resources based on one or more features intended for communication on the set of resources. In order to facilitate communications with the "legacy" UEs 115, a base station 105 may transmit an indication of the features that are to be supported for communication on a set of resources, and UEs 115 that fail to support these features may ignore these resources. In some aspects, the base station 105 may indicate to a group of UEs 115 a release of a wireless standard that fails to support the features intended for communication on the set of resources, and, in other aspects, the base station 105 may indicate an optional feature of a standard that is to be supported for communication on the set of resources. Consequently, UEs 115 that do not support the release of the wireless standard or the optional feature may ignore ensuing communications on the set of resources.

Figure 2:
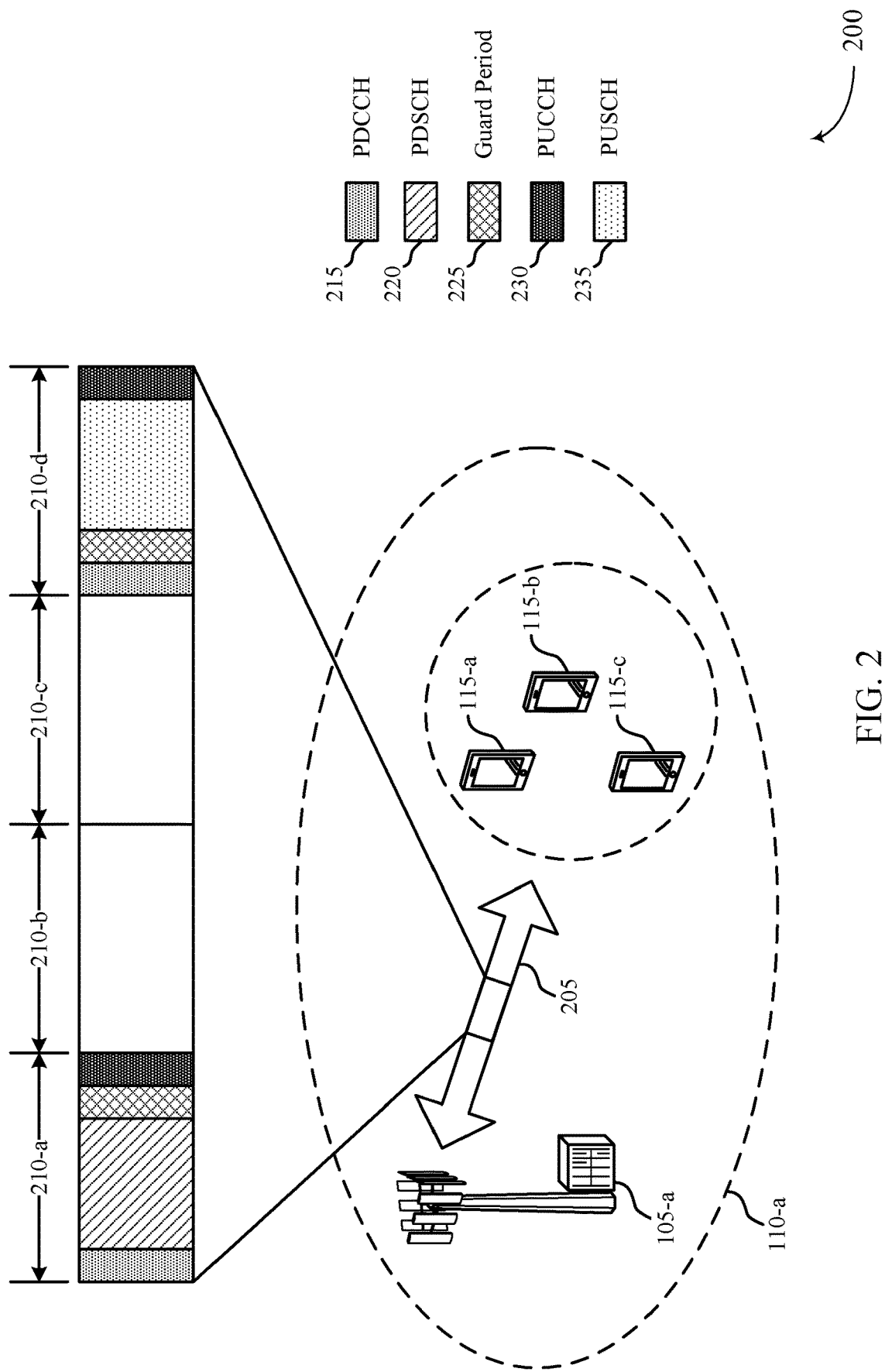
FIG. 2 illustrates an example of a wireless communications system that supports forward compatibility in NR systems in accordance with various aspects of the present disclosure.

FIG. 2 illustrates an example of a wireless communications system 200 that supports forward compatibility in NR systems in accordance with various aspects of the present disclosure. Wireless communications system 200 includes base station 105-a, which may be an example of a base station 105 as described with reference to FIG. 1. Wireless communications system 200 also includes UE 115-a, UE 115-*b*, and UE 115-*c*, which may be examples of a UE 115 as described with reference to FIG. 1.

Base station 105-*a* and UEs 115-*a*, 115-*b*, and 115-*c* may communicate over a carrier 205 during slots 210. Each of the slots 210 may have the same duration (e.g., 500 μs) and may be designated as a downlink-centric slot or an uplink-centric slot. For example, slot 210-*a* may be an example of a downlink-centric slot and may include a physical downlink control channel (PDCCH) 215, a physical downlink shared channel (PDSCH) 220, a guard period 225, and a physical uplink control channel (PUCCH) 230. Slot 210-*d* may be an example of an uplink centric slot and may include a PDCCH 215, a guard period 225, a physical uplink shared channel (PUSCH) 230, and a PUCCH 235. In some aspects, slots 210-*b* and 210-*c* may also be referred to as forward compatible resources.

In the example of FIG. 2, base station 105-*a* may schedule communications on a set of resources with a group of UEs 115 that support a particular feature. As described herein, base station 105-*a* may transmit an indication to a group of UEs 115 of the feature that is to be supported in order for a UE 115 to communicate on the set of resources. Base station 105-*a* may transmit the indication in a system information block (SIB) (e.g., for a semi-static allocation of resources) or a PDCCH 215 (e.g., for a dynamic allocation of resources). In one aspect, base station 105-*a* may indicate that the feature is to be supported for communication on a set of resources that includes an entire system bandwidth during a slot 210. In other aspects, base station 105-*a* may indicate that the feature is to be supported for communication on a set of resources that includes a portion of a system bandwidth during a slot 210 or a smaller fraction of a slot 210 (e.g., a mini-slot).

In one aspect, base station 105-*a* may indicate a release of a wireless standard (e.g., release 15 (Rel-15), release 14 (Rel-14), etc.) that excludes the feature that is to be supported for communication on the set of resources. As such, a UE 115 may determine whether the feature is supported based on a release of the wireless standard supported by the UE 115. For example, if the latest release supported by the UE 115 is the indicated release or an earlier release than the indicated release, the UE 115 may determine that the particular feature is unsupported, and the UE 115 may ignore the set of resources. Alternatively, if the latest release supported by the UE 115 is a later release than the indicated release, the UE 115 may determine that the particular feature is supported, and the UE 115 may communicate with base station 105-*a* according to the particular feature.

As an example, base station 105-*a* may schedule communications during slot 210-*b* with UEs 115 supporting release 16 (Rel-16) of a wireless standard and communications on slot 210-*c* with UEs 115 supporting Rel-15 of the wireless standard. UE 115-*a* may be an example of a Rel-16 UE, UE 115-*b* may be an example of a Rel-15 UE, and UE 115-*c* may be an example of a Rel-14 UE. Base station 105-*a* may then transmit an indication that UEs 115 supporting Rel-15 or lower releases may fail to support features for communicating during slot 210-*b* and another indication that UEs 115 supporting Rel-14 or lower releases may fail to support features for communicating during slot 210-*c*. UEs 115 may receive the indications and each UE 115 may determine whether to communicate during slots 210-*b* and 210-*c* based on the indications. For example, UE 115-*a* (i.e., the Rel-16 UE) may determine to communicate during slots 210-*b* and 210-*c*, UE 115-*b* (i.e., the Rel-15 UE) may determine to ignore slot 210-*b* and communicate during slot 210-*c*, and UE 115-*b* (i.e., the Rel-14 UE) may determine to ignore slots 210-*b* and 210-*c*.

In another aspect, base station 105-*a* may indicate an optional feature of a release that is to be supported for communication on the set of resources. As such, a UE 115 may determine whether to communicate on the set of resources based on determining whether the optional feature is supported. Accordingly, if the UE 115 fails to support the optional feature, the UE 115 may ignore the set of resources. Alternatively, if the UE 115 supports the optional feature, UE 115 may communicate with base station 105-*a* on the set of resources. As an example, base station 105-*a* may schedule communications during slot 210-*b* with UEs 115 supporting over-the-air (OTA)-based dynamic time division duplex (TDD) operation. Accordingly, a UE 115 may determine whether to communicate during slot 210-*b* based on whether this mode of operation is supported. If the UE 115 supports this mode of operation, the UE 115 may communicate with base station 105-*a* during slot 210-*b*, and if the UE 115 fails to support this mode of operation, the UE 115 may ignore slot 210-*b*.

In yet another aspect, base station 105-*a* may indicate a release that excludes a feature that is to be supported for communication on a set of resources, as well as an optional feature of a release that is to be supported for communication on the set of resources. Accordingly, a UE 115 may determine whether to communicate on the set of resources based on if the UE 115 supports a later release than the indicated release and whether the optional feature is supported. As an example, base station 105-*a* may schedule communications during slot 210-*b* with UEs 115 supporting an optional feature included in Rel-16. Base station 105-*a* may then transmit an indication of Rel-15 and the optional feature to be supported for communication on a set of resources to a group of UEs 115. Accordingly, a UE 115 may receive the indication and determine whether to communicate during slot 210-*b* based on whether the UE 115 supports a later release than Rel-15, as well as the optional feature.

Figure 3:
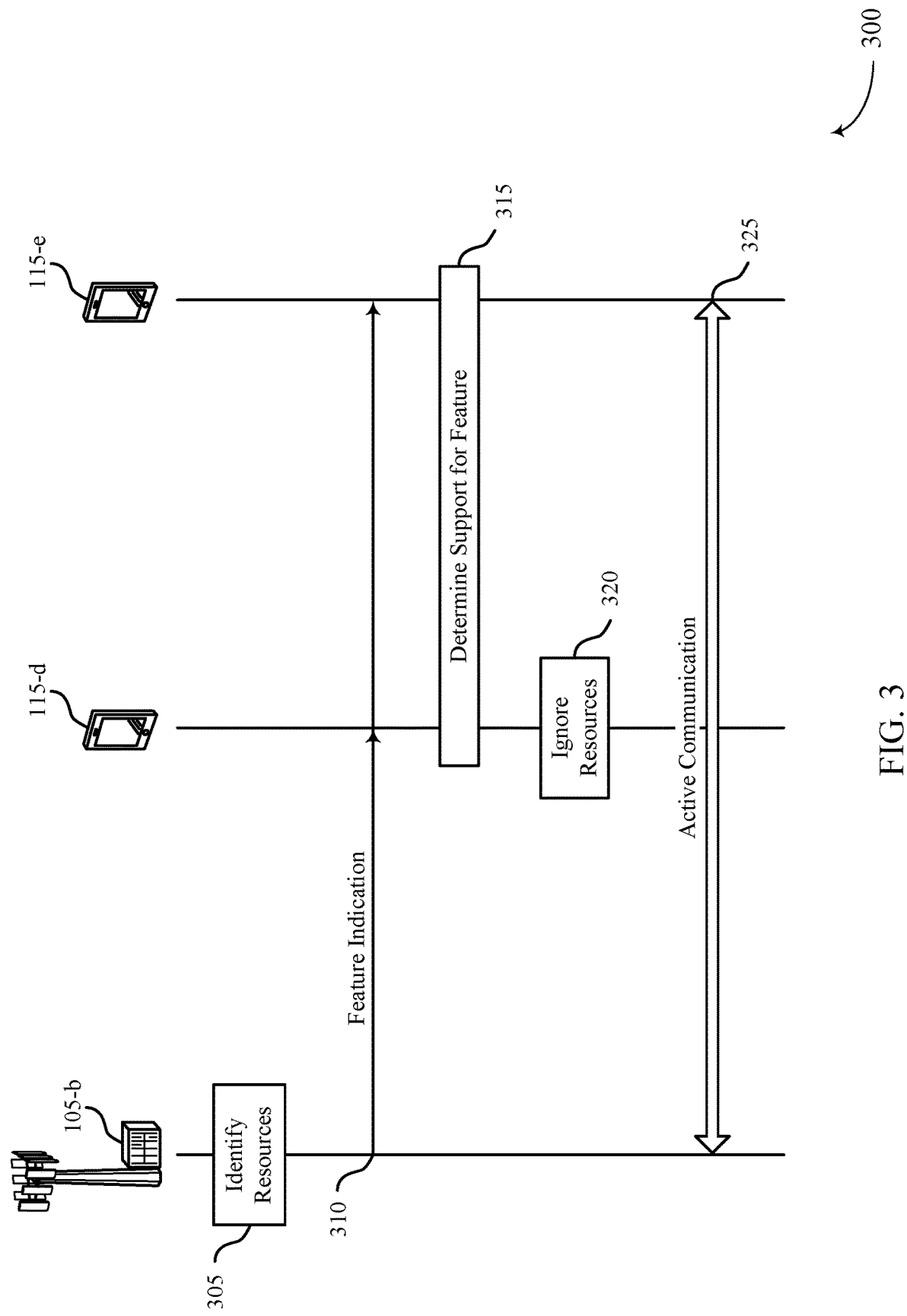
FIG. 3 illustrates an example of a process flow that supports forward compatibility in NR systems in accordance with various aspects of the present disclosure.

FIG. 3 illustrates an example of a process flow 300 that supports forward compatibility in NR systems in accordance with various aspects of the present disclosure. Process flow 300 illustrates aspects of techniques performed by a base station 105-*b*, which may be an example of a base station 105 described with reference to FIGS. 1 and 2. Process flow 300 also illustrates aspects of techniques performed by a UE 115-*d* and a UE 115-*e*, which may be examples of a UE 115 described with reference to FIGS. 1 and 2.

At 305, base station 105-*b* may identify a set of resources for communication with one or more UEs 115. In some aspects, base station 105-*b* may identify a condition to avoid communicating with UEs 115 that fail to support one or more features (e.g., UE 115-*d*), and the base station 105-*b* may schedule communications on the set of resources according to the one or more features based on the identification. At 310, base station 105-*b* may transmit an indication to UE 115-*d* and UE 115-*e* that identifies the one or more features that are to be supported in order for the UEs 115 to communicate on the set of resources (e.g., based on identifying the condition to avoid communicating with UEs 115 that fail to support the one or more features). The indication may identify a release of a wireless standard that excludes the one or more features, one or more optional features of a wireless standard, or a combination thereof. The indication may be transmitted in a SIB or in a PDCCH.

At 315, UE 115-*d* and UE 115-*e* may determine whether the one or more features are supported based on a release of a wireless standard supported, a type of the one or more features, or a combination thereof. In the example of FIG. 3, UE 115-*d* may determine that the one or more features are unsupported, and UE 115-*e* may determine that the one or more features are supported. For example, UE 115-*d* may determine that the release of the wireless standard supported by UE 115-*d* is the same as the release of the wireless standard that excludes the one or more features or is an earlier release than the release of the wireless standard that excludes the one or more features, and, based on this determination, UE 115-*d* may determine that the one or more features are unsupported. Additionally or alternatively, UE 115-*e* may determine that a later release is supported by UE 115-*e* than the release of the wireless standard that excludes the one or more features, and, based on this determination, UE 115-*e* may determine that the one or more features are supported.

At 320, UE 115-*d* may ignore the set of resources (e.g., refrain from communicating on the set of resources) based on determining that the one or more features are unsupported based on the release of the wireless standard supported by UE 115-*d*, the type of the one or more features, or a combination thereof. For example, UE 115-*d* may ignore the set of resources based on determining that the release of the wireless standard supported by UE 115-*d* is the same as the release of the wireless standard that excludes the one or more features or is an earlier release than the release of the wireless standard that excludes the one or more features. Additionally or alternatively, UE 115-*d* may ignore the set of resources based on determining that the optional features identified in the indication are unsupported.

At 325, base station 105-*b* and UE 115-*e* may communicate on the set of resources according to the one or more features identified in the indication. Thus, UE 115-*d* may be forward compatible since UE 115-*d* may be able to ignore resources (e.g., forward compatible resources) used for communication between base station 105-*b* and UE 115-*e* (e.g., a UE 115 supporting more advanced features than UE 115-*d*).

Figure 4:
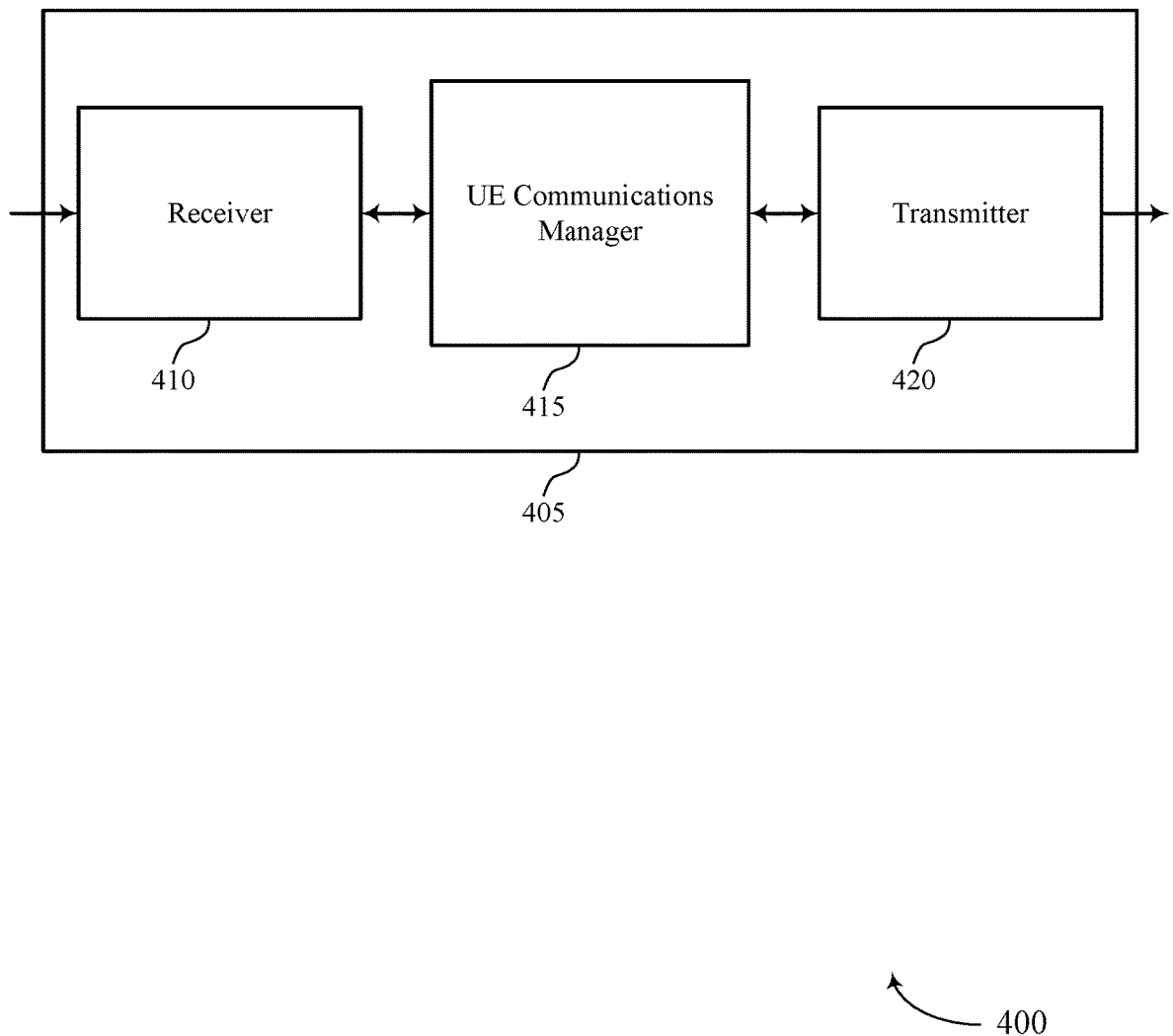
FIGS. 4 through 6 show block diagrams of a device that supports forward compatibility in NR systems in accordance with various aspects of the present disclosure.

FIG. 4 shows a block diagram 400 of a wireless device 405 that supports forward compatibility in NR systems in accordance with various aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to forward compatibility in NR systems, etc.). Information may be passed on to other components of the device. The receiver 410 may be an example of aspects of the transceiver 635 described with reference to FIG. 6. The receiver 410 may utilize a single antenna or a set of antennas.

UE communications manager 415 may be an example of aspects of the UE communications manager 615 described with reference to FIG. 6. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive an indication that identifies one or more features that are to be supported in order to communicate on a set of resources, determine that the one or more features are unsupported based on a release of a wireless standard supported by the UE, a type of the one or more features, or a combination thereof, and ignore the set of resources based on the determination.

Transmitter 420 may transmit signals generated by other components of the device. In some examples, the transmitter 420 may be collocated with a receiver 410 in a transceiver module. For example, the transmitter 420 may be an example of aspects of the transceiver 635 described with reference to FIG. 6. The transmitter 420 may utilize a single antenna or a set of antennas.

Figure 5:
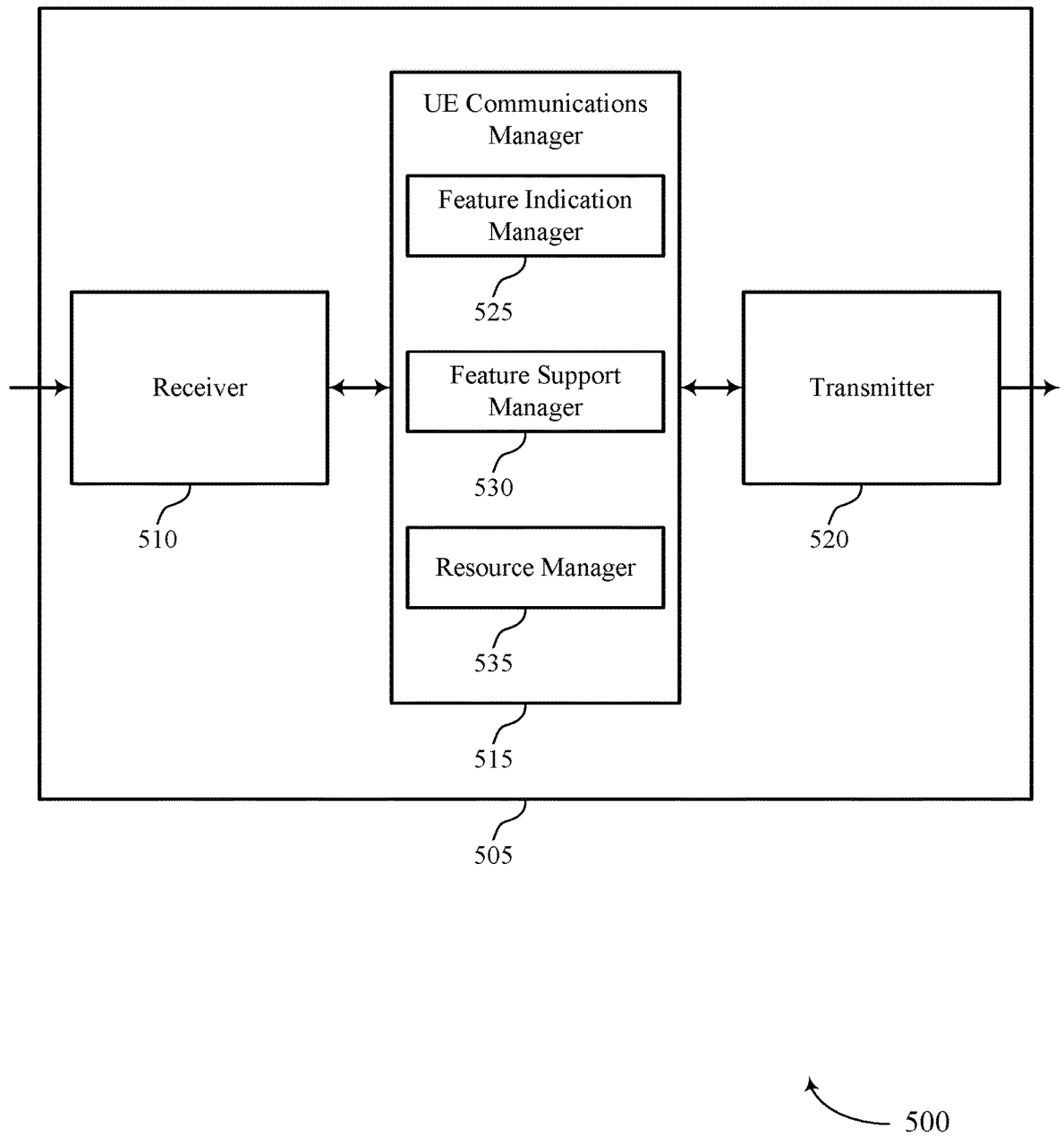

FIG. 5 shows a block diagram 500 of a wireless device 505 that supports forward compatibility in NR systems in accordance with various aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to forward compatibility in NR systems, etc.). Information may be passed on to other components of the device. The receiver 510 may be an example of aspects of the transceiver 635 described with reference to FIG. 6. The receiver 510 may utilize a single antenna or a set of antennas.

UE communications manager 515 may be an example of aspects of the UE communications manager 615 described with reference to FIG. 6. UE communications manager 515 may include feature indication manager 525, feature support manager 530, and resource manager 535.

Feature indication manager 525 may receive an indication that identifies one or more features that are to be supported in order to communicate on a set of resources. In some aspects, receiving the indication that identifies the one or more features includes receiving an indication that identifies a release of a wireless standard that excludes the one or more features. In some aspects, receiving the indication that identifies the one or more features includes receiving an indication that identifies one or more optional features of a wireless standard. In some aspects, the indication may be received in a SIB. Alternatively, the indication may be received on a PDCCH.

Feature support manager 530 may determine that the one or more features are unsupported based on a release of a wireless standard supported by a UE, a type of the one or more features, or a combination thereof. In some aspects, feature support manager 530 may determine that the release of the wireless standard supported by the UE includes the release of the wireless standard that excludes the one or more features or an earlier release than the release of the wireless standard that excludes the one or more features. Resource manager 535 may ignore the set of resources based on the determination. In some aspects, the set of resources includes forward compatible resources.

Transmitter 520 may transmit signals generated by other components of the device. In some examples, the transmitter 520 may be collocated with a receiver 510 in a transceiver module. For example, the transmitter 520 may be an example of aspects of the transceiver 635 described with reference to FIG. 6. The transmitter 520 may utilize a single antenna or a set of antennas.

Figure 6:
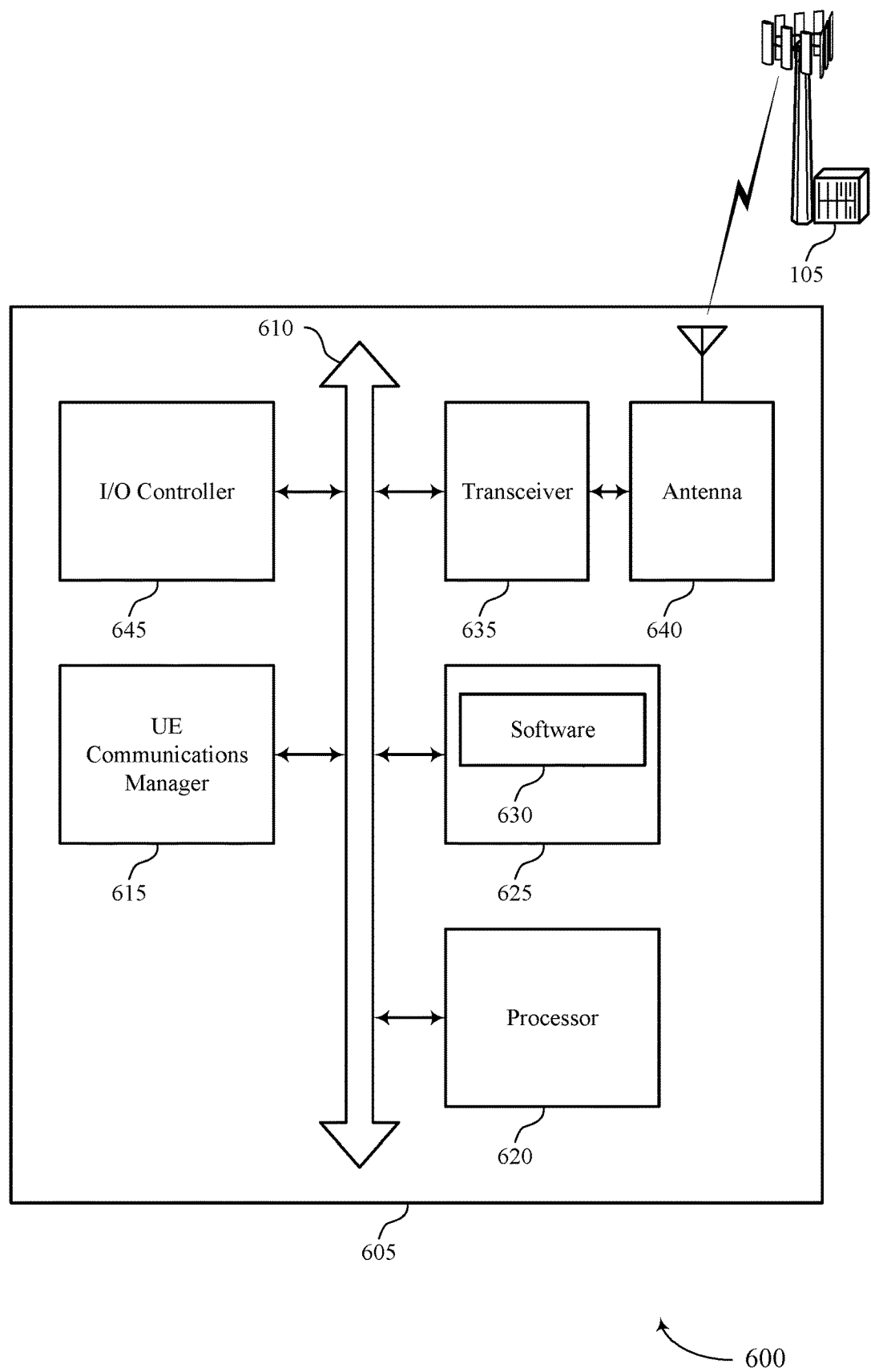

FIG. 6 shows a diagram of a system 600 including a device 605 that supports forward compatibility in NR systems in accordance with various aspects of the present disclosure. Device 605 may be an example of or include the components of wireless device 405, wireless device 505, or a UE 115 as described above, e.g., with reference to FIGS. 4 and 5. Device 605 may include components for bi-directional voice and data communications including components for transmitting and receiving communications, including UE communications manager 615, processor 620, memory 625, software 630, transceiver 635, antenna 640, and I/O controller 645. These components may be in electronic communication via one or more buses (e.g., bus 610). Device 605 may communicate wirelessly with one or more base stations 105.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 620 may be configured to operate a memory array using a memory controller. In other aspects, a memory controller may be integrated into processor 620. Processor 620 may be configured to execute computer-readable instructions stored in a memory to perform various functions (e.g., functions or tasks supporting forward compatibility in NR systems).

Memory 625 may include random access memory (RAM) and read only memory (ROM). The memory 625 may store computer-readable, computer-executable software 630 including instructions that, when executed, cause the processor to perform various functions described herein. In some aspects, the memory 625 may contain, among other things, a basic input/output system (BIOS) that may control basic hardware or software operation such as the interaction with peripheral components or devices.

Software 630 may include code to implement aspects of the present disclosure, including code to support forward compatibility in NR systems. Software 630 may be stored in a non-transitory computer-readable medium such as system memory or other memory. In some aspects, the software 630 may not be directly executable by the processor but may cause a computer (e.g., when compiled and executed) to perform functions described herein.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas. In some aspects, the wireless device may include a single antenna 640. However, in some aspects, the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some aspects, I/O controller 645 may represent a physical connection or port to an external peripheral. In some aspects, I/O controller 645 may utilize an operating system such as iOS®, ANDROID®, MS-DOS®, MS-WINDOWS®, OS/2®, UNIX®, LINUX®, or another known operating system. In other aspects, I/O controller 645 may represent or interact with a modem, a keyboard, a mouse, a touchscreen, or a similar device. In some aspects, I/O controller 645 may be implemented as part of a processor. In some aspects, a user may interact with device 605 via I/O controller 645 or via hardware components controlled by I/O controller 645.

Figure 7:
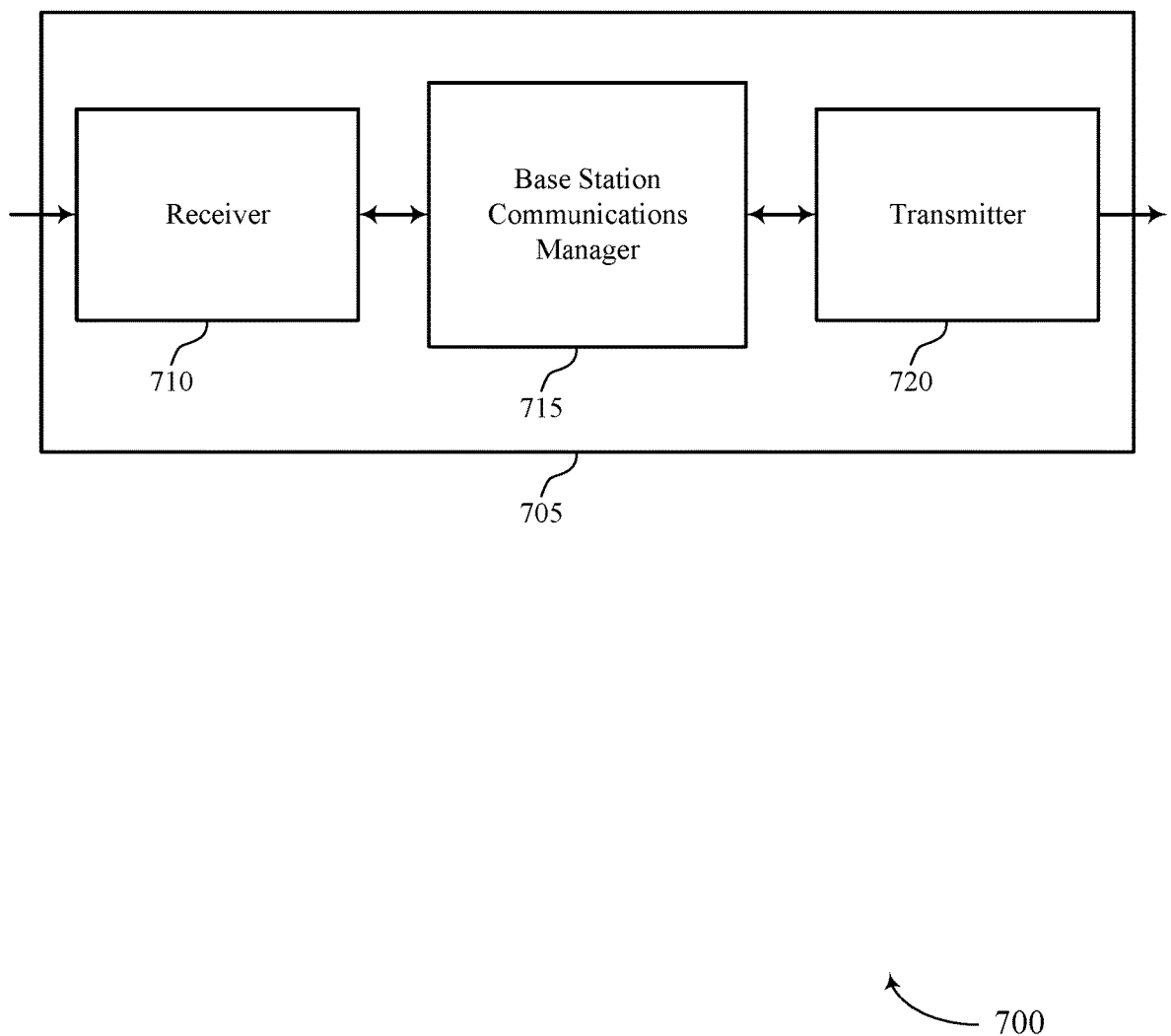
FIG. 7 illustrates a block diagram of a system including a UE that supports forward compatibility in NR systems in accordance with various aspects of the present disclosure.

FIG. 7 shows a block diagram 700 of a wireless device 705 that supports forward compatibility in NR systems in accordance with various aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to forward compatibility in NR systems, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may identify a set of resources for communication with one or more UEs and transmit an indication that identifies one or more features that are to be supported in order for the UEs to communicate on the set of resources. Base station communications manager 715 may coordinate with receiver 710 and transmitter 720 to communicate on the set of resources with the one or more UEs that support the one or more features identified by the indication.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
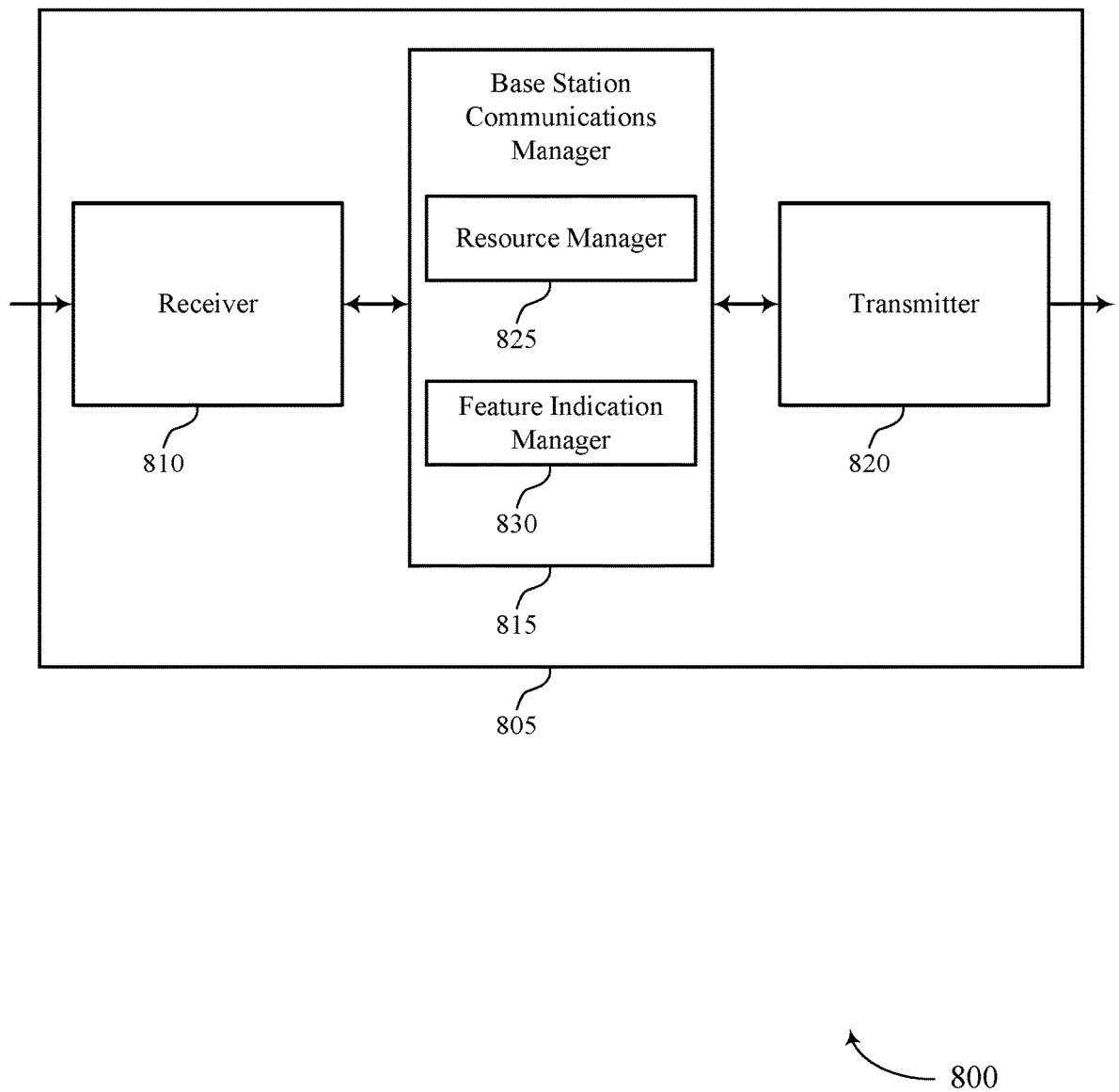
FIGS. 8 through 10 show block diagrams of a device that supports forward compatibility in NR systems in accordance with various aspects of the present disclosure.

FIG. 8 shows a block diagram 800 of a wireless device 805 that supports forward compatibility in NR systems in accordance with various aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to forward compatibility in NR systems, etc.). Information may be passed on to other components of the device. The receiver 810 may be an example of aspects of the transceiver 935 described with reference to FIG. 9. The receiver 810 may utilize a single antenna or a set of antennas.

Base station communications manager 815 may be an example of aspects of the base station communications manager 915 described with reference to FIG. 9. Base station communications manager 815 may include resource manager 825 and feature indication manager 830. Resource manager 825 may identify a set of resources for communication with one or more UEs. In some aspects, the set of resources includes forward compatible resources.

Feature indication manager 830 may transmit an indication that identifies one or more features that are to be supported in order for the UEs to communicate on the set of resources. In some aspects, feature indication manager 830 may identify a condition to avoid communicating with a UE that fails to support the one or more features, transmit the indication that identifies the one or more features that are to be supported in order for the UE to communicate on the set of resources based on the identified condition, and coordinate with receiver 810 and transmitter 820 to refrain from communicating with the UE based on transmitting the indication.

In some aspects, transmitting the indication that identifies the one or more features includes transmitting an indication that identifies a release of a wireless standard that excludes the one or more features. In some aspects, transmitting the indication that identifies the one or more features includes transmitting an indication that identifies one or more optional features of a wireless standard. In some aspects, the indication of the one or more features may be transmitted in a SIB. Alternatively, the indication of the one or more features may be transmitted on a PDCCH.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9. The transmitter 820 may utilize a single antenna or a set of antennas.

Figure 9:
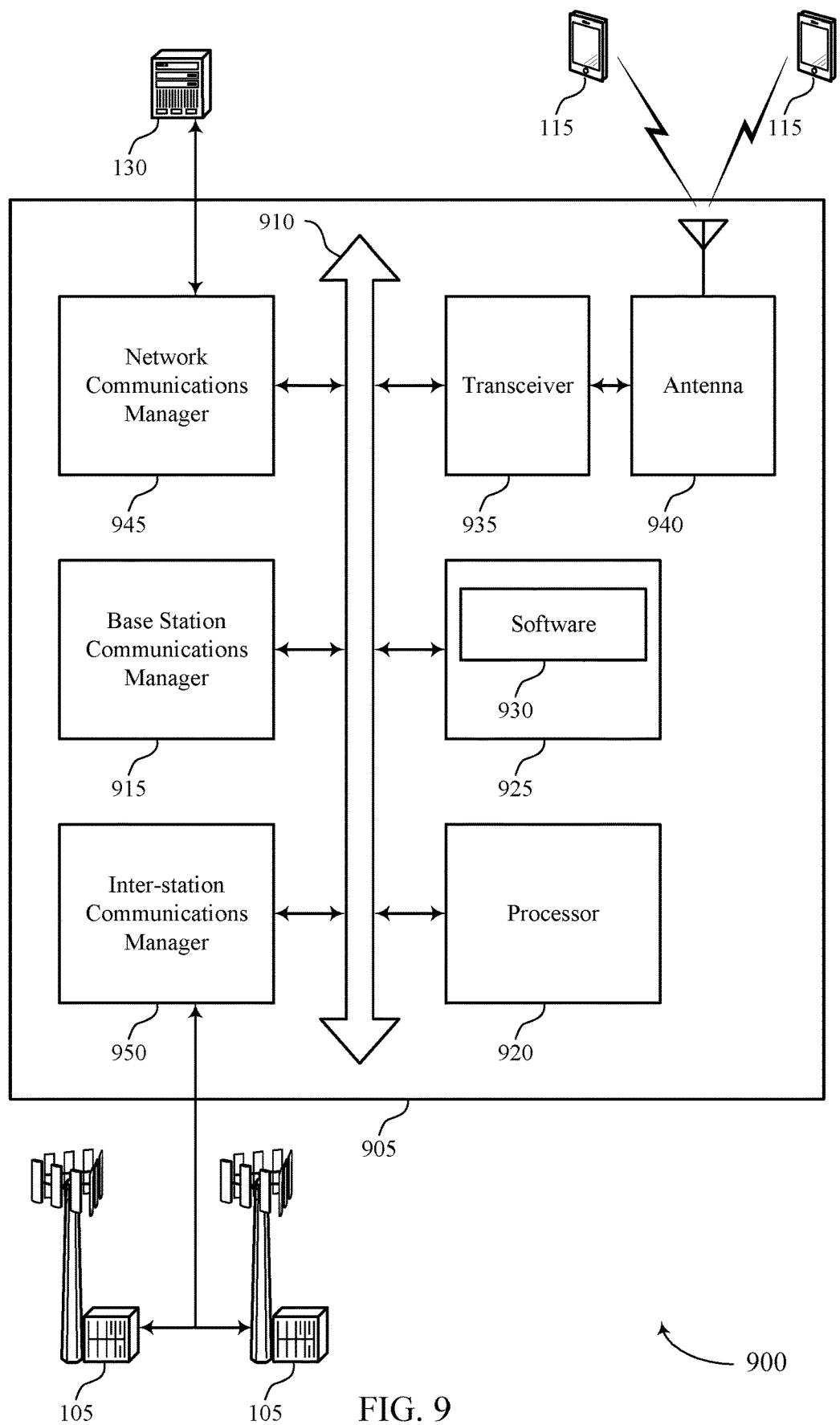

FIG. 9 shows a diagram of a system 900 including a device 905 that supports forward compatibility in NR systems in accordance with various aspects of the present disclosure. Device 905 may be an example of or include the components of base station 105 as described above, e.g., with reference to FIG. 1. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 920 may be configured to operate a memory array using a memory controller. In other aspects, a memory controller may be integrated into processor 920. Processor 920 may be configured to execute computer-readable instructions stored in a memory to perform various functions (e.g., functions or tasks supporting forward compatibility in NR systems).

Memory 925 may include RAM and ROM. The memory 925 may store computer-readable, computer-executable software 930 including instructions that, when executed, cause the processor to perform various functions described herein. In some aspects, the memory 925 may contain, among other things, a BIOS that may control basic hardware or software operation such as the interaction with peripheral components or devices.

Software 930 may include code to implement aspects of the present disclosure, including code to support forward compatibility in NR systems. Software 930 may be stored in a non-transitory computer-readable medium such as system memory or other memory. In some aspects, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some aspects, the wireless device may include a single antenna 940. However, in some aspects, the device may have more than one antenna 940, which may be capable of concurrently transmitting or receiving multiple wireless transmissions. Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
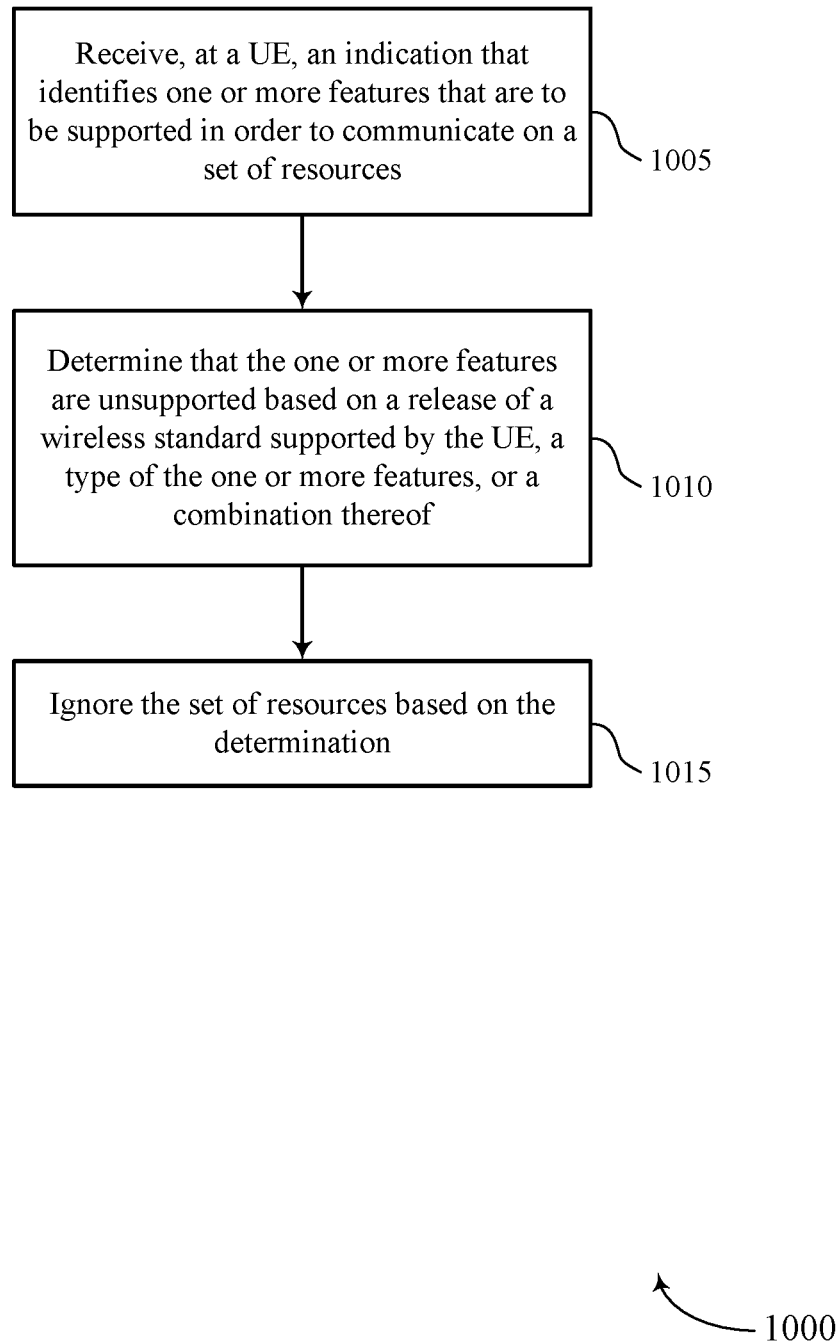

FIG. 10 shows a flowchart illustrating a method 1000 that supports forward compatibility in NR systems in accordance with various aspects of the present disclosure. The operations of method 1000 may be implemented by a UE 115 or its components as described herein. For example, the operations of method 1000 may be performed by a UE communications manager as described with reference to FIGS. 4 through 6. In some examples, a UE 115 may execute a set of codes to control the functional elements of the device to perform the functions described below. Additionally, the UE 115 may perform aspects of the functions described below using special-purpose hardware.

At block 1005 the UE 115 may receive, at a UE, an indication that identifies one or more features that are to be supported in order to communicate on a set of resources. The operations of block 1005 may be performed according to the methods described herein. In certain examples, aspects of the operations of block 1005 may be performed by a feature indication manager as described with reference to FIGS. 4 through 6.

At block 1010 the UE 115 may determine that the one or more features are unsupported based on a release of a wireless standard supported by the UE, a type of the one or more features, or a combination thereof. The operations of block 1010 may be performed according to the methods described herein. In certain examples, aspects of the operations of block 1010 may be performed by a feature support manager as described with reference to FIGS. 4 through 6.

At block 1015 the UE 115 may ignore the set of resources based on the determination. The operations of block 1015 may be performed according to the methods described herein. In certain examples, aspects of the operations of block 1015 may be performed by a resource manager as described with reference to FIGS. 4 through 6.

Figure 11:
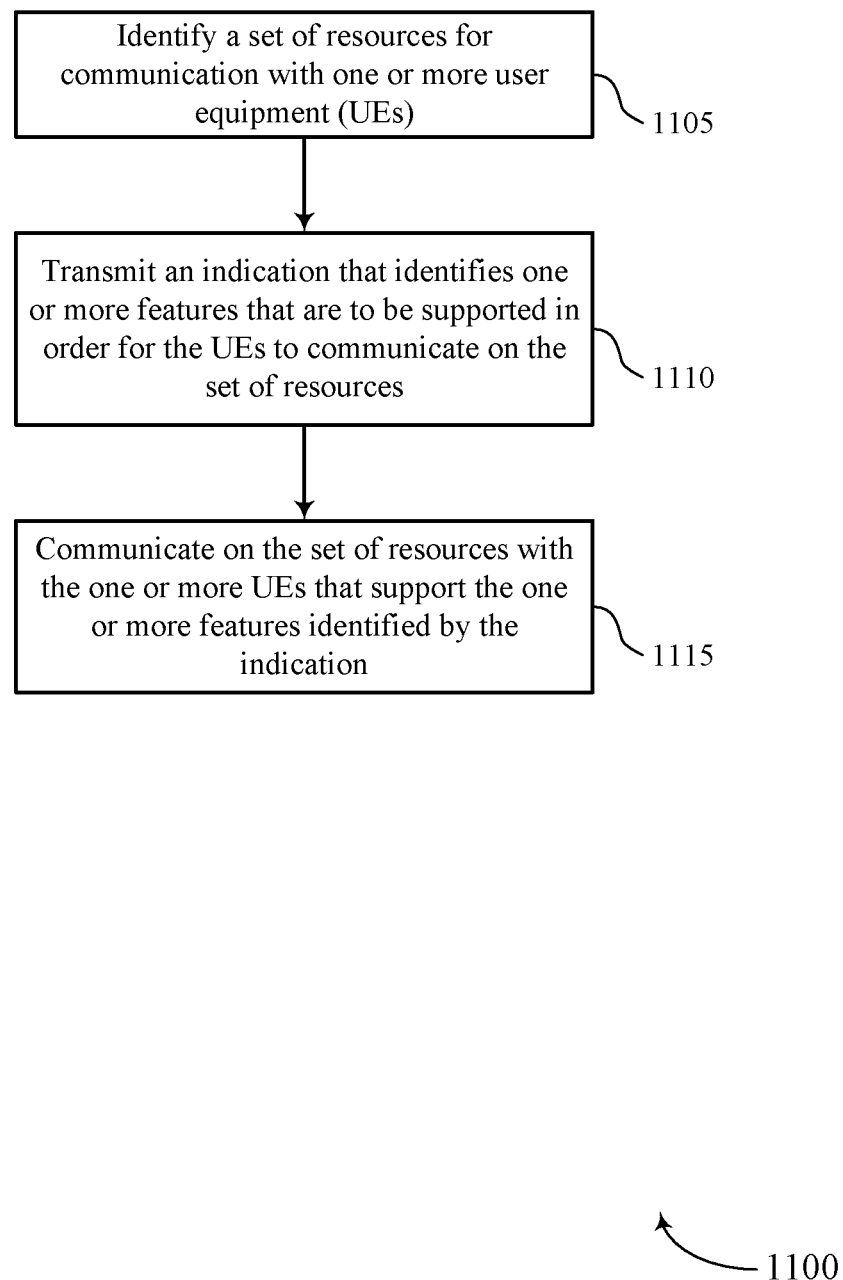
FIG. 11 illustrates a block diagram of a system including a base station that supports forward compatibility in NR systems in accordance with various aspects of the present disclosure.

FIG. 11 shows a flowchart illustrating a method 1100 that supports forward compatibility in NR systems in accordance with various aspects of the present disclosure. The operations of method 1100 may be implemented by a base station 105 or its components as described herein. For example, the operations of method 1100 may be performed by a base station communications manager as described with reference to FIGS. 7 through 9. In some examples, a base station 105 may execute a set of codes to control the functional elements of the device to perform the functions described below. Additionally, the base station 105 may perform aspects of the functions described below using special-purpose hardware.

At block 1105 the base station 105 may identify a set of resources for communication with one or more UEs. The operations of block 1105 may be performed according to the methods described herein. In certain examples, aspects of the operations of block 1105 may be performed by a resource manager as described with reference to FIGS. 7 through 9.

At block 1110 the base station 105 may transmit an indication that identifies one or more features that are to be supported in order for the UEs to communicate on the set of resources. The operations of block 1110 may be performed according to the methods described herein. In certain examples, aspects of the operations of block 1110 may be performed by a feature indication manager as described with reference to FIGS. 7 through 9.

At block 1115 the base station 105 may communicate on the set of resources with the one or more UEs that support the one or more features identified by the indication. The operations of block 1115 may be performed according to the methods described herein. In certain examples, aspects of the operations of block 1115 may be performed by a transmitter as described with reference to FIGS. 7 through 9.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), an indication from a base station that identifies one or more features that are required to be supported by the UE for the UE to communicate on a set of resources;
   determining, at the UE, that the one or more features as indicated by the base station are unsupported by the UE based at least in part on a release of a wireless standard supported by the UE, wherein the release of the wireless standard supported by the UE comprises a common protocol that enables wireless communications for different wireless devices; and
   ignoring the set of resources based at least in part on the determination that the one or more features are unsupported by the UE based at least in part on the release of the wireless standard support by the UE.

2. The method of claim 1, wherein receiving the indication that identifies the one or more features comprises:
   receiving an indication that identifies a release of the wireless standard that excludes the one or more features.

3. The method of claim 2, further comprising:
   determining that the release of the wireless standard supported by the UE comprises the release of the wireless standard that excludes the one or more features or an earlier release than the release of the wireless standard that excludes the one or more features; and
   ignoring the set of resources based at least in part on the determination.

4. The method of claim 1, wherein receiving the indication that identifies the one or more features comprises:
   receiving an indication that identifies one or more optional features of the wireless standard.

5. The method of claim 1, wherein the set of resources comprises forward compatible resources.

6. The method of claim 1, wherein the indication is received in a system information block (SIB).

7. The method of claim 1, wherein the indication is received on a physical downlink control channel (PDCCH).

8. A method for wireless communication, comprising:
   identifying a set of resources for communication with one or more user equipment (UEs), wherein the set of resources is associated with one or more features of a release of a wireless standard required to be supported for use of the set of resources;
   transmitting, from a base station, an indication that identifies the one or more features of a release of a wireless standard required to be supported for a UE of the one or more UEs to communicate on the set of resources, wherein the release of the wireless standard to be supported comprises a common protocol that enables wireless communications for different wireless devices; and
   communicating on the set of resources with at least one of the one or more UEs that support the one or more features identified by the indication.

9. The method of claim 8, wherein transmitting the indication that identifies the one or more features of the release of the wireless standard comprises:
   transmitting an indication that identifies a release of a wireless standard that excludes the one or more features.

10. The method of claim 8, wherein transmitting the indication that identifies the one or more features of the release of the wireless standard comprises:
    transmitting an indication that identifies one or more optional features of a wireless standard.

11. The method of claim 8, wherein the set of resources comprises forward compatible resources.

12. The method of claim 8, wherein the indication of the one or more features is transmitted in a system information block (SIB).

13. The method of claim 8, wherein the indication of the one or more features is transmitted on a physical downlink control channel (PDCCH).

14. The method of claim 8, further comprising:
    identifying a condition to avoid communicating with a UE that fails to support the one or more features of the release of the wireless standard;
    transmitting the indication that identifies the one or more features that are to be supported in order for the UE to communicate on the set of resources based at least in part on the identified condition; and
    refraining from communicating with the UE based at least in part on transmitting the indication.

15. An apparatus for wireless communication, comprising:
    a processor;
    memory in electronic communication with the processor; and
    instructions stored in the memory and operable, when executed by the processor, to cause the apparatus to:
    receive, at a user equipment (UE), an indication from a base station that identifies one or more features required to be supported by the UE for the UE to communicate on a set of resources;

determine, at the UE, that the one or more features as indicated by the base station are unsupported by the UE based at least in part on a release of a wireless standard supported by the UE, wherein the release of the wireless standard supported by the UE comprises a common protocol that enables wireless communications for different wireless devices; and ignore the set of resources based at least in part on the determination that the one or more features are unsupported by the UE based at least in part on the release of the wireless standard support by the UE.

16. The apparatus of claim 15, wherein the instructions are further executable by the processor to:

receive an indication that identifies a release of the wireless standard that excludes the one or more features.

17. The apparatus of claim 16, wherein the instructions are further executable by the processor to:

determine that the release of the wireless standard supported by the apparatus comprises the release of the wireless standard that excludes the one or more features or an earlier release than the release of the wireless standard that excludes the one or more features; and ignore the set of resources based at least in part on the determination.

18. The apparatus of claim 15, wherein the instructions are further executable by the processor to:

receive an indication that identifies one or more optional features of the wireless standard.

19. The apparatus of claim 15, wherein the set of resources comprises forward compatible resources.

20. The apparatus of claim 15, wherein the indication is received in a system information block (SIB) or on a physical downlink control channel (PDCCH).

21. An apparatus for wireless communication, comprising:

a processor;

memory in electronic communication with the processor; and instructions stored in the memory and operable, when executed by the processor, to cause the apparatus to:

identify a set of resources for communication with one or more user equipments (UEs), wherein the set of resources is associated with one or more features of a release of a wireless standard required to be supported for use of the set of resources;

transmit, from a base station, an indication that identifies the one or more features of the release of the wireless standard required to be supported for a UE of the one or more UEs to communicate on the set of resources, wherein the release of the wireless standard required to be supported comprises a common protocol that enables wireless communications for different wireless devices; and communicate on the set of resources with at least one of the one or more UEs that support the one or more features identified by the indication.

22. The apparatus of claim 21, wherein the instructions are further executable by the processor to:

transmit an indication that identifies a release of a wireless standard that excludes the one or more features.

23. The apparatus of claim 21, wherein the instructions are further executable by the processor to:

transmit an indication that identifies one or more optional features of a wireless standard.

24. The apparatus of claim 21, wherein the set of resources comprises forward compatible resources.

25. The apparatus of claim 21, wherein the indication of the one or more features is transmitted in a system information block (SIB) or on a physical downlink control channel (PDCCH).

26. The apparatus of claim 21, wherein the instructions are further executable by the processor to:

identify a condition to avoid communicating with a UE that fails to support the one or more features;

transmit the indication that identifies the one or more features of the release of the wireless standard that are to be supported in order for the UE to communicate on the set of resources based at least in part on the identified condition; and refrain from communicating with the UE based at least in part on transmitting the indication.

27. A method of wireless communication at a user equipment (UE) configured to use communications resources according to a supported first set of features, comprising:

receiving signaling, at the UE, from a base station of configuration of a set of communication resources, the set of communication resources including one or more resources for features included in the first set of features, wherein the features included in the first set of features are required to use the one or more resources, and further comprising one or more resources for at least one feature included in a second different set of features and not included in the first set of features;

receiving signaling indicating an association of the at least one feature with the second set of features;

determining, at the UE, that the one or more first features as indicated by the base station are supported by the UE and that the second set of features as indicated by the base station are unsupported by the UE; and communicating using communication resources for features included in the first set of features and not communicating using the one or more resources for the at least one feature included in the second different set of features.

28. The method of claim 27, wherein the first set of features includes a plurality of required features for a first version of a wireless standard, and wherein the second set of features includes one or more features selected from the group consisting of:

at least one optional feature for the first version of the wireless standard, at least one required feature for a second later version of the wireless standard, and at least one required feature for a third version of the wireless standard, the third version of the wireless standard later than the first version and the second version.

29. The method of claim 27, wherein receiving signaling indicating an association of the at least one feature with the second set of features further comprises:

receiving a system information block (SIB) or a physical downlink control channel (PDCCH) indicating that one or more slots of the set of communication resources is associated with a particular feature not included in the first set of features.

30. The method of claim 27, wherein receiving signaling indicating an association of the at least one feature with the second set of features further comprises:

receiving signaling indicating an identification of a particular version of a wireless standard including the second set of features.

* * * * *